No Printed Specification Available
4945X
M. Petre. Sheet 1. 2 Sheets.
Flocking Mach.
No. Patented Dec. 20, 1827.
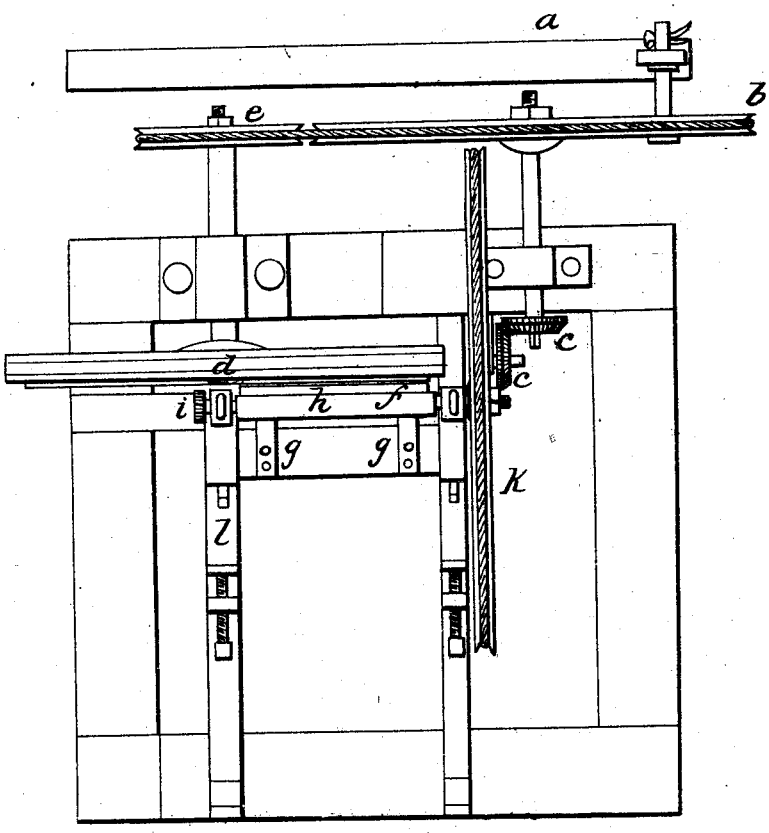

4945X
M. Petre. Sheet 2. 2 Sheets.
Flocking Mach.
No.
Patented Dec. 20, 1827.
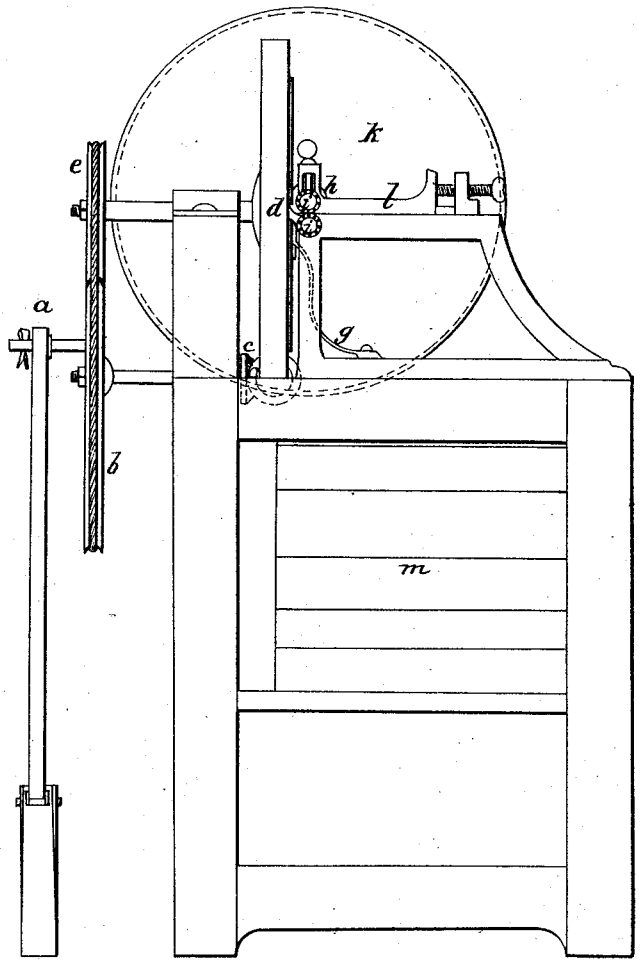
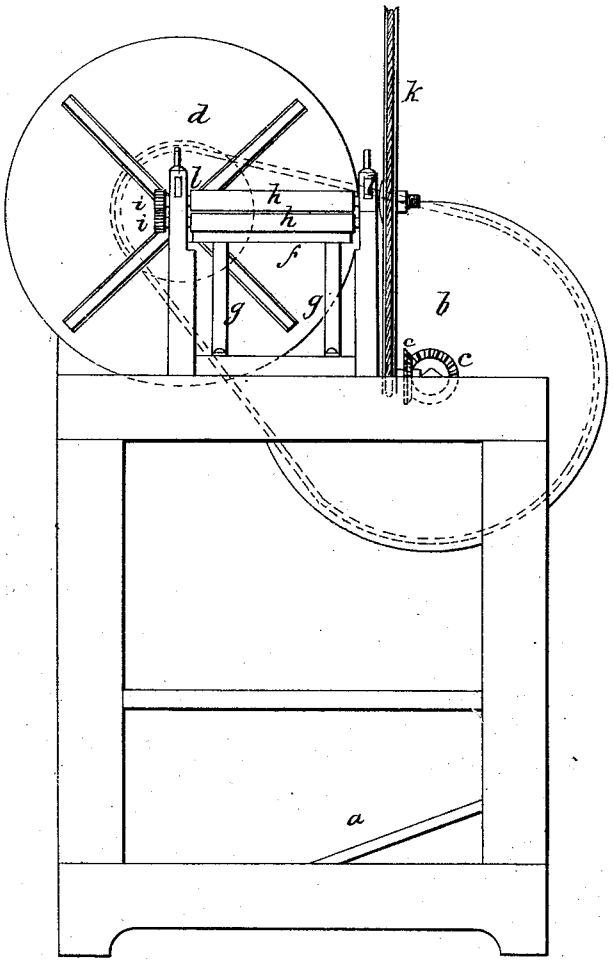

United States Patent Office

PTO - BOYERS, PA Duty Station

MISSING PAGE TEMPORARY NOTICE

PATENT # 4945X FOR ISSUE DATE 12-20-1827

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa